US012600461B2

(12) United States Patent
Paesano et al.

(10) Patent No.: US 12,600,461 B2
(45) Date of Patent: Apr. 14, 2026

(54) COVERING SYSTEM AND METHOD FOR A PITCH LINK OF A HELICOPTER

(71) Applicant: THE BOEING COMPANY, Arlington, VA (US)

(72) Inventors: Antonio Paesano, Wilmington, DE (US); Douglas R. Ludin, Malvern, PA (US); Howard Rolleston, Glen Mills, PA (US)

(73) Assignee: The Boeing Company, Arlington, VA (US)

( * ) Notice: Subject to any disclaimer, the term of this patent is extended or adjusted under 35 U.S.C. 154(b) by 399 days.

(21) Appl. No.: 18/313,424

(22) Filed: May 8, 2023

(65) Prior Publication Data

US 2024/0376939 A1    Nov. 14, 2024

(51) Int. Cl.
| | |
|---|---|
| *B64C 11/32* | (2006.01) |
| *B64C 27/54* | (2006.01) |
| *B64C 27/59* | (2006.01) |
| *F16J 3/04* | (2006.01) |

(52) U.S. Cl.
CPC .............. *B64C 11/32* (2013.01); *B64C 27/54* (2013.01); *B64C 27/59* (2013.01); *F16J 3/042* (2013.01)

(58) Field of Classification Search
CPC ......... B64C 11/30; B64C 11/32; B64C 27/54; B64C 27/59; B64C 27/605; F16J 3/042
See application file for complete search history.

(56) References Cited

U.S. PATENT DOCUMENTS

| | | | | |
|---|---|---|---|---|
| 2,599,690 A | * | 6/1952 | Buivid .................. | B64C 27/605 |
| | | | | 416/114 |
| 2,623,598 A | * | 12/1952 | Erle ........................ | B64C 27/54 |
| | | | | 416/27 |
| 2,861,640 A | * | 11/1958 | Du Pont ................. | B64C 27/41 |
| | | | | 416/102 |
| 2011/0256941 A1 | * | 10/2011 | Takabe ..................... | F16J 3/043 |
| | | | | 464/175 |
| 2024/0068433 A1 | * | 2/2024 | Wiebrecht .............. | F02M 61/14 |

* cited by examiner

*Primary Examiner* — Elton K Wong
(74) *Attorney, Agent, or Firm* — Joseph M. Butscher; The Small Patent Law Group LLC

(57) ABSTRACT

A covering system and method for a pitch link of a helicopter include a boot having a bellows, and a cap removably secured to the boot. The boot and the cap are configured to cover at least a portion of the pitch link. The cap is removable from the boot to provide access to the pitch link.

20 Claims, 11 Drawing Sheets

COVERING SYSTEM AND METHOD FOR A PITCH LINK OF A HELICOPTER

FIELD OF THE DISCLOSURE

Examples of the present disclosure generally relate to systems and methods for covering pitch links of helicopters.

BACKGROUND OF THE DISCLOSURE

Known helicopters include pitch links (also referred to as pitch control links or pitch control rods) that connect a swashplate with a blade of a rotor assembly. Pitch links are configured to allow for a pitch of a blade to be controlled during operation of the helicopter. In particular, a pitch link is configured to adjust an angle of the blade on a per-revolution basis.

Typically, covers are disposed over pitch links in order to protect the pitch links from any atmospheric precipitation, sand, dust, debris, projectile fragments, and the like. A known cover for a pitch link includes a waterproof shroud having a zipper. The zipper allows the shroud to be opened and closed so that the pitch link can be accessed, such as for inspection and maintenance.

However, the cover can form a basin that allows water, snow, sand, dust, debris, projectile fragments, and the like to collect therein. Such materials can potentially infiltrate other portions of a helicopter. Further, over time, the zipper can be compromised, such as by dust, sand, debris, and the like. Also, ice accumulated on the cover typically needs to be manually removed before flight. Also, the known cover includes additional components, such as an aluminum ring and a gasket, which add weight, complexity, and cost to the cover.

SUMMARY OF THE DISCLOSURE

A need exists for an improved system and method for covering a pitch link of a helicopter. Further, a need exists for a durable cover for a pitch link. Additionally, a need exists for an efficient and cost-effective cover for a pitch link.

With those needs in mind, certain examples of the present disclosure provide a covering system for a pitch link of a helicopter. The covering system includes a boot having a bellows, and a cap removably secured to the boot. The boot and the cap are configured to cover at least a portion of the pitch link. The cap is removable from the boot to provide access to the pitch link.

In at least one example, the boot and the cap are formed of a flexible material. For example, the flexible material includes a thermoplastic elastomer.

In at least one example, the bellows includes a plurality of outwardly-extending ribs and a plurality of inwardly-extending indentations. As a further example, the plurality of outwardly-extending ribs include curved surfaces. In at least one example, the plurality of outwardly-extending ribs have a first thickness, and the plurality of inwardly-extending indentations have a second thickness. The first thickness differs from the second thickness.

In at least one example, an upper neck extends from a first end of the bellows, and a base is at a second end of the bellows. The second end is opposite from the first end, and the second end is wider than the first end.

In at least one example, the boot includes one or more securing pins that are configured to be removably retained within one or more slots of the cap.

In at least one example, the cap is configured to cover an upper end of the pitch link.

In at least one other example, the cap includes a passage that allows an upper end of the pitch link to extend upwardly out of the cap.

In at least one example, the cap includes one or more slots that receive and retain one or more tabs of the boot to secure the cap to the boot.

In at least one example, the cap includes a first lip and a second lip removably secured together. The first lip and the second lip are configured to be separated to open the cap.

One or both of the boot or the cap can include a plurality of tie passages that are configured to receive one or more flexible ties.

In at least one example, the cap includes a seal configured to be sealingly retained within a channel of a shaft of the pitch link.

Certain examples of the present disclosure provide a covering method for a pitch link of a helicopter. The covering method includes removably securing a cap removably to a boot having a bellows, wherein the boot and the cap are configured to cover at least a portion of the pitch link, and wherein the cap is removable from the boot to provide access to the pitch link.

Certain examples of the present disclosure provide a helicopter including a rotor assembly including a pitch link, and a covering system for the pitch link, as described herein.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide a covering system for a pitch link that includes a boot and a cap that removably secures to the boot. The boot and cap are formed of flexible materials, such as an elastomeric material (for example, rubber), a thermoplastic elastomer, and/or the like. In at least one example, the boot includes a bellows or main body having a bellows-shape that is configured to compress and extend. In at least one example, the cover secures to a neck of the main body through one or more pins of the neck that pass through slots of the cover or flexible ties that pass through slots of the cover. The cover may extend over an end of the pitch link and be configured to abut into a surface of a blade of a rotor assembly. As another example, the cap can include a passage that allows an upper end of the pitch link to pass therethrough so that the pitch link directly abuts into surface of the blade.

In contrast to prior known covers, examples of the present disclosure are more durable in that they are not formed of a fabric having a zipper. For example, the boot and cap can be formed of thermoplastic elastomer and are devoid of a zipper, which may otherwise provide a path for liquid intrusion, and can deteriorate and/or jam over time due to exposure to atmospheric conditions.

The cap is removably secured to the boot. As such, the cap can be removed from the boot in order to provide quick and easy inspection and/or adjustment of the pitch link.

Additionally, in at least one example, the covering system is devoid of a metal securing ring (in contrast to the prior known covers that include aluminum securing rings), thereby reducing weight, complexity, and cost.

Figure 1:
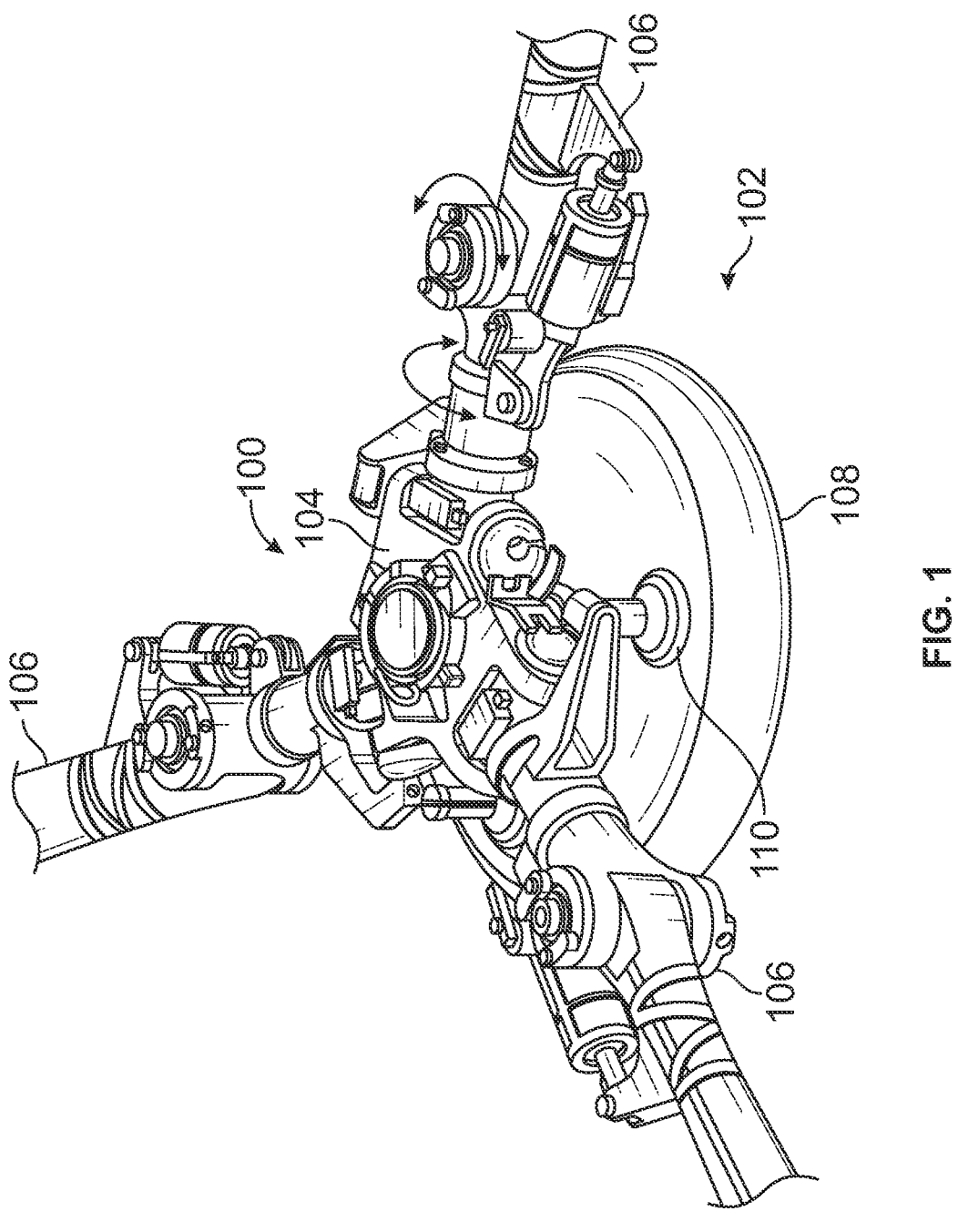
FIG. 1 illustrates an isometric top view of a rotor assembly of a helicopter, according to an example of the present disclosure.

FIG. 1 illustrates an isometric top view of a rotor assembly 100 of a helicopter 102, according to an example of the present disclosure. The rotor assembly 100 includes a hub 104 having a plurality of blades 106 extending outwardly therefrom. A protective shield 108 is disposed underneath the hub 104. The protective shield 108 provides a weatherprotective cover. Pitch links extend upwardly through the protective shield 108. The pitch links are configured to adjust the pitch of the blades 106. A covering system 110 is configured to cover at least a portion of a pitch link, such as at least a portion of an upper end of the pitch link.

Figure 2:
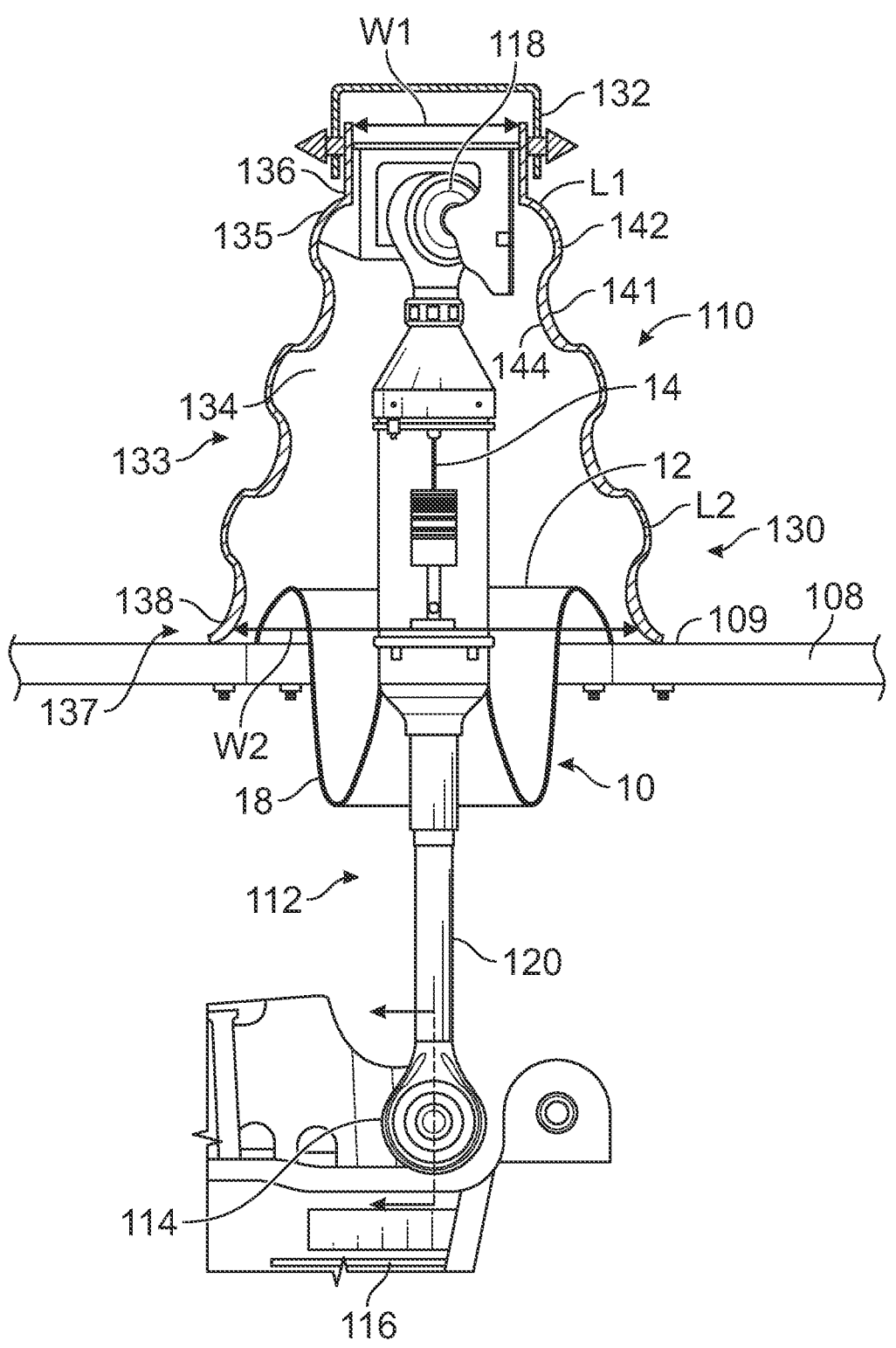
FIG. 2 illustrates an axial cross-sectional view of a covering system for a pitch link, according to an example of the present disclosure, in contrast to a prior known cover.

FIG. 2 illustrates an axial cross-sectional view of a covering system 110 for a pitch link 112, according to an example of the present disclosure, in contrast to a prior known cover 10. The pitch link 112 includes a lower end 114 coupled to a swashplate 116 and an upper end 118 that is configured to exert a pitch-adjusting force into a blade, such as the blade 106. The pitch link 112 includes a shaft 120 that connects the lower end 114 to the upper end 118. In at least one example, the swashplate 116 has a stationary lower end and rotating upper ring. The pitch link 112 connects to a pitch arm to change the pitch of the blade 106.

As shown, the known cover 10 includes a fabric covering 12 and a zipper 14. The fabric covering 12 forms a circumferential basin 18 that downwardly extends into an opening of the protective shield 108. The circumferential basin 18 can collect liquid, sand, snow, hail, dust, debris, and/or the like therein.

In contrast, the covering system 110 includes a boot 130 and a cap 132 removably secured to the boot 130. The covering system 110 is devoid of a zipper. In at least one example, the covering system 110 is also devoid of a metal securing ring. Further, the covering system 110 does not provide a depression that can retain water, dust, sand, and other material in particulate form, such as the circumferential basin 18.

Instead, the boot 130 includes a bellows 133 having a main body 134. An upper neck 136 extends from an upper small end of the bellows 133. A lower large end of the bellows 133 includes a base 138. The bellows 133 includes a plurality of flexible circumferential outwardly-directed ribs 142 (for example, crests) and a plurality of flexible circumferential inwardly-directed indentations 144 (for example, roots). The ribs 142 and indentations 144 combine to form a convolution of the bellows 133. The boot 130 and the cap 132 are formed of a flexible material, such as an elastomeric material (for example, rubber), a thermoplastic elastomer, and/or the like. Each of the boot 130 and the cap 132 can be integrally molded and formed as a piece of injection molded material, such as thermoplastic elastomer.

The ribs 142 and indentations 144 includes curved surfaces, which are in contrast to sharp ridges or edges of other bellows type structures. The curved surfaces provide a more resilient, and long-lasting bellows 133. Notably, if two bellows having the same convolution free length and the same number of crests and roots, with one bellows having sharp-edged roots and crests, and the other having rounded roots and crests, undergo the same reduction of the convolution free length, the angular strain of the sharp-edged roots and crests is lower than that of the rounded roots and crests. As such, the bellows having the rounded crests and roots is more durable.

As shown, the upper neck 136 extends upwardly from a first end 135 of the bellows 133. The base 138 is at a second end 137 of the bellows 133. The second end 137 is opposite from the first end 135, and the second end 137 is wider than the first end 135. As shown, the width of the bellows 133 expands from the upper neck 136 toward the base 138. In particular, a width W1 (for example, a diameter) of the upper neck 136 is less than a width W2 of the base 138. The width of the ribs 142 may progressively expand at each level toward the base 138. For example, the width of the rib 142 at level L1 proximate to the upper neck 136 is less than the width of the rib 142 at level L2 proximate to the base 138.

The bellows 133 has a large end at the base 138 and a small end at the upper neck 136. The ribs 142 and indentations 144 provide a plurality of curved folds of variable thickness, and therefore variable stiffness. In particular, the ribs 142 are thinner than the indentations 144. As such, the ribs 142 more easily deform than the indentations 144. Further, the indentations 144 remain relatively open during compression of the bellows 133, and trap less external material in any folds. The cap 132 is removably secured to the upper neck 136.

The base 138 is configured to abut into an upper surface 109 of the protective shield 108. Because the main body 134 outwardly expands from the upper neck 136 toward the base 138, the boot 130 is not susceptible to downwardly collapsing to form a depression that can retain water dust, sand, and other material in particulate form, such as basin 18.

Figure 3:
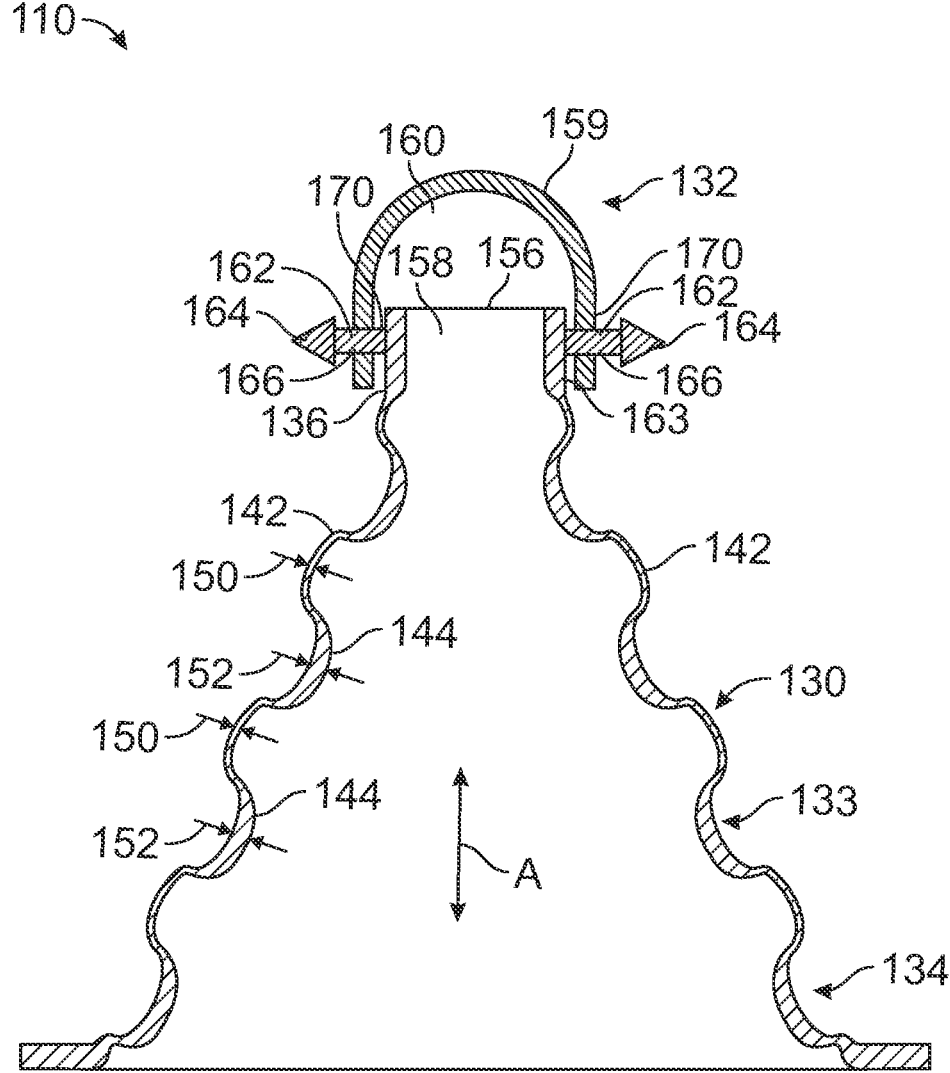
FIG. 3 illustrates an axial cross-sectional view of the covering system, according to an example of the present disclosure.

FIG. 3 illustrates an axial cross-sectional view of the covering system 110, according to an example of the present disclosure. As shown, a thickness 150 of the ribs 142 can be less than a thickness 152 of the indentations 144. For example, the thickness 152 can be at least double the thickness 150. The thicker indentations 144 are stiffer (that is less flexible) than the thinner ribs 142, thereby allowing the main body 134 to axially compress and extend in the directions of arrows A while the thicker indentations 144 ensure that the main body 134 does not downwardly collapse to form a depression. The boot 130 can include more or fewer ribs 142 and indentations 144 than shown. Alternatively, the ribs 142 and indentations 144 can have the same thickness. Also, alternatively, the ribs 142 can be thicker than the indentations 144.

The upper neck 136 includes an opening 156 that leads into an internal chamber 158 of the boot 130. As shown in FIGS. 2 and 3, at least a portion of the upper end 118 and the shaft 120 of the pitch link 112 is disposed within the internal chamber 158. In at least one example, the cap 132 covers the upper end 118. For example, the cap 132 includes one or more walls 159 that define an interior space 160 into which the upper end 118 is disposed.

One or more securing pins 162 outwardly extend from an outer surface 163 of the upper neck 136. The pins 162 include an expanded head 164 outwardly extending from a beam 166. The pins 162 are configured to extend through slots 170 formed in the cap 132. For example, the pins 162 are flexible and are configured to deflect so that the heads 164 can pass into and through the slots 170. The heads 164 are made of a flexible material (such as rubber) and can have larger widths that the slots 170, so that after the heads 164 are inserted through the slots 170, the cap 132 is secured to the boot 130. In order to remove the cap 132 from the boot 130, the deflectable and flexible heads 164 and cap 132 can be manipulated, such as by the cap 132 being rotated and/or the flexible heads 164 being compressed, so that the pins 162 slide through the slots 170, and the cap 132 is removed from the upper neck 136. In this manner, the cap 132 can be removed, and the boot 130 can be downwardly compressed so that the pitch link 112 can be easily inspected. After inspection, maintenance, and/or the like, the boot 130 can be disengaged to deflect back to an at-rest position (as shown in FIG. 3), and the cap 132 can be re-secured to the upper neck 136, thereby providing covered protection over the pitch link 112. As described, in at least one example, the boot 130 includes one or more securing pins 162 that are configured to be removably retained within one or more slots 170 of the cap 132.

Figure 4:
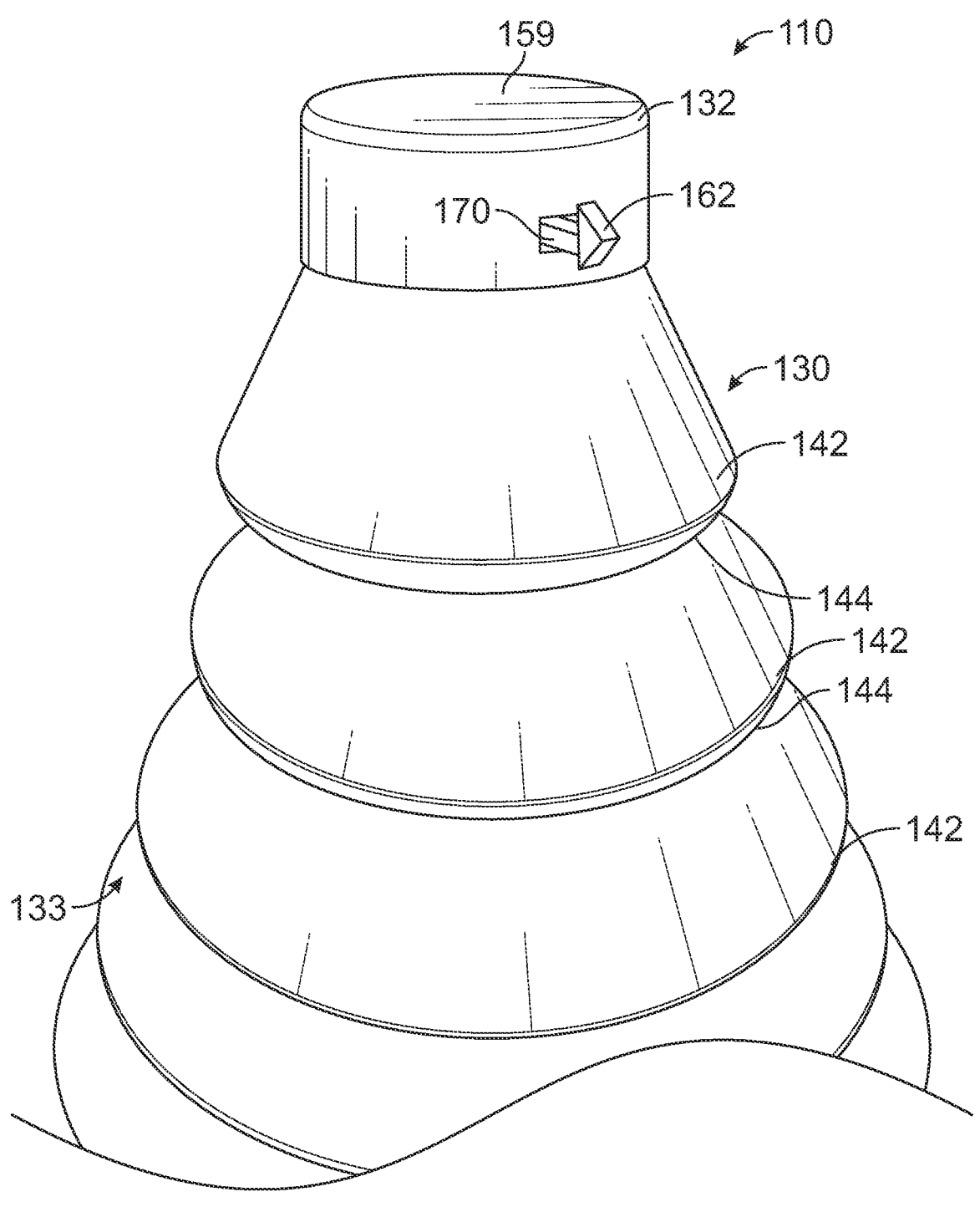
FIG. 4 illustrate a perspective top view of the covering system of FIG. 3.

FIG. 4 illustrate a perspective top view of the covering system 110 of FIG. 3. As shown, a securing pin 162 of the boot 130 extends through a slot 170 of the cap 132.

Figure 5:
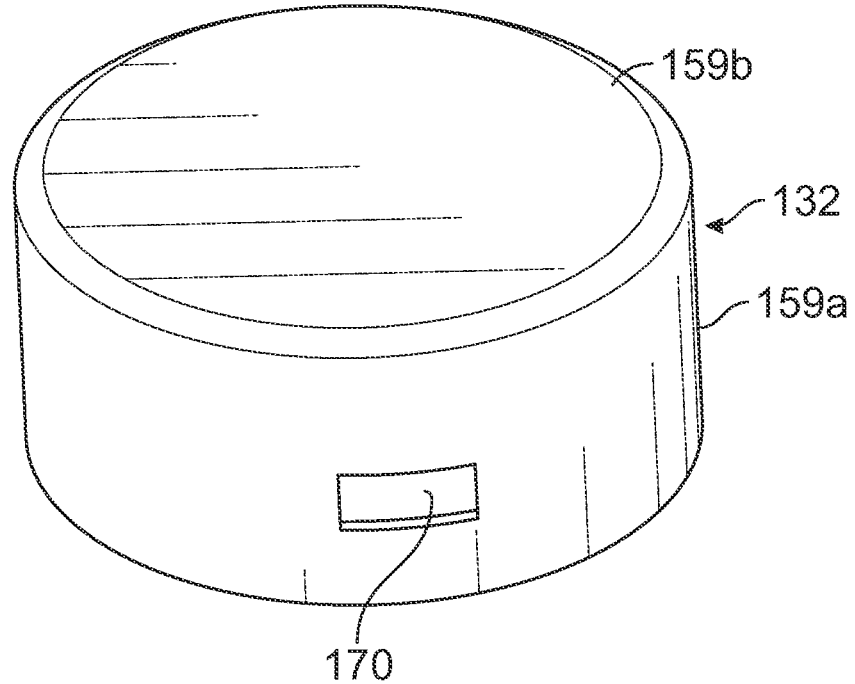
FIG. 5 illustrates a perspective top view of a cap, according to an example of the present disclosure.

FIG. 5 illustrates a perspective top view of the cap 132, according to an example of the present disclosure. In at least one example, the cap 132 incudes a circumferential wall 159a connected to a top wall 159b. The walls 159a and 159b are configured to cover the upper end 118 of the pitch link 112 (shown in FIG. 2). The top wall 159b is configured to be disposed between the upper end 118 of the pitch link 112 and a lower surface of a blade 106 (shown in FIG. 1).

Referring to FIGS. 4 and 5, the slot 170 is formed through the cap 132, such as through the circumferential wall 159a. The slot 170 is sized and shaped to allow the head 164 to fit therethrough in a first alignment, but prevented from passing through in a second alignment that is orthogonal to the first alignment. For example, when the cap 132 is pivoted into a vertical orientation in relation to the boot 130, the head 164 can pass into and through the slot 170 (thereby allowing the cap 132 to be secured to or removed from the boot 130). In contrast, when the cap 132 is in a horizontal orientation in relation to the boot 130, the head 164 cannot pass into and through the slot 170, thereby ensuring that the cap 132 remains secured to the boot 130. The cap 132 can be manipulated as desired to remove the cap 132 from the boot 130.

Figures 6, 7:
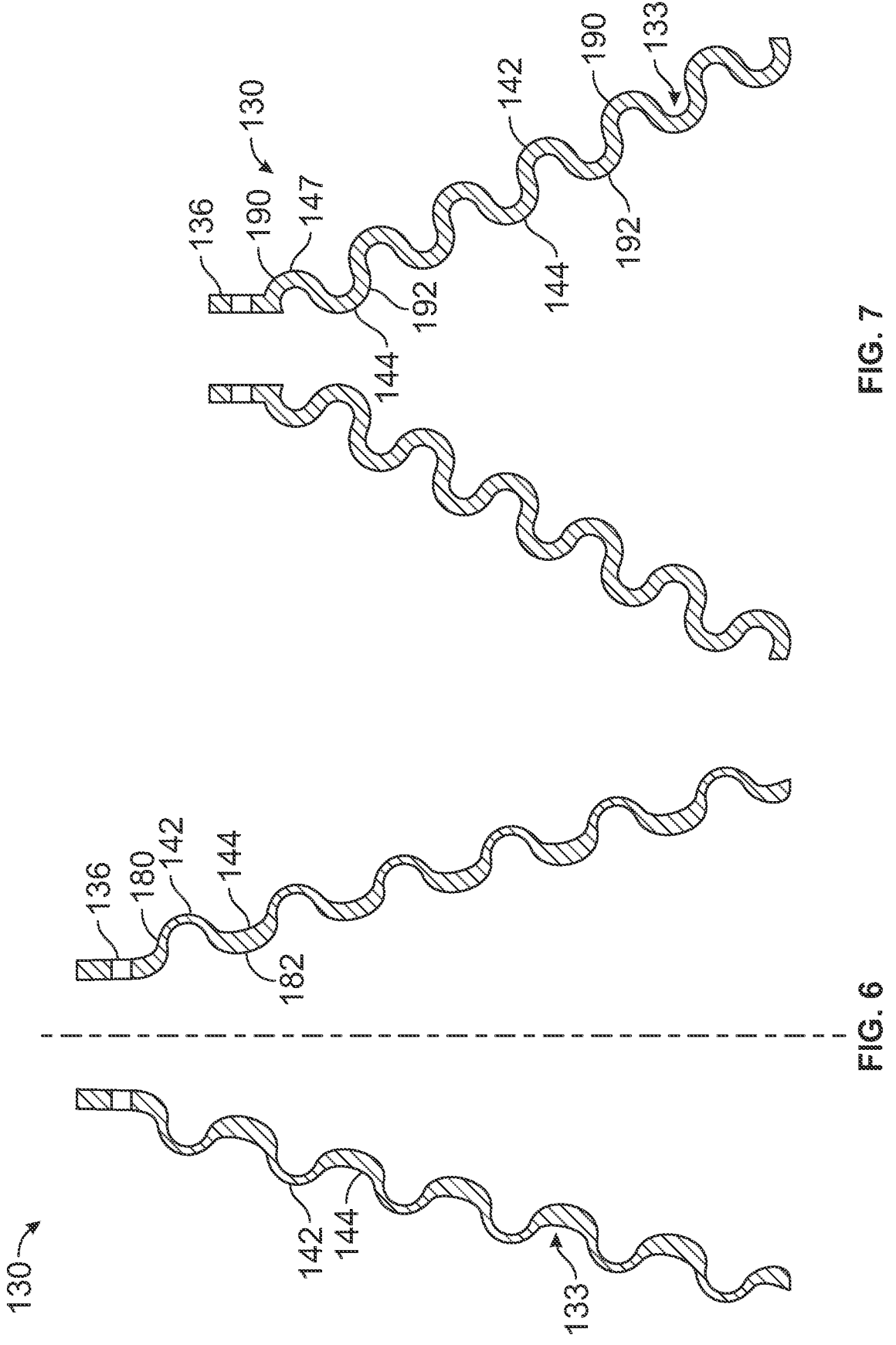
FIG. 6 illustrates an axial cross-sectional view of a boot, according to an example of the present disclosure.
FIG. 7 illustrates an axial cross-sectional view of a boot, according to an example of the present disclosure.

FIG. 6 illustrates an axial cross-sectional view of the boot 130, according to an example of the present disclosure. In this example, the ribs 142 can have outwardly-curved bowed surfaces 180, and the indentations 144 can have curved (or optionally, flat) surfaces 182. In at least one example, the thickness of the indentations 144 can be greater than the thickness of the ribs 142. The ribs 142 provide increased flexibility that allow for the boot 130 to compress and extend. The thicker indentations 144 provide increased stability and less flexibility than the ribs 142, thereby ensuring that the boot 130 does not downwardly collapse to form a depression. The boot 130 can include more or fewer ribs 142 and indentations 144 than shown.

FIG. 7 illustrates an axial cross-sectional view of the boot 130, according to an example of the present disclosure. In this example, the ribs 142 can have outwardly-curved bowed surfaces 190, and the indentations 144 can have inwardly-curved bowed surface 192. The thickness of the boot 130 can be uniform, such that the ribs 142 and the indentations 144 have the same thickness. Optionally, the ribs 142 can be thicker than the indentations 144, or vice versa. The boot 130 can include more or fewer ribs 142 and indentations 144 than shown. In at least one example, the indentations 144 can be thicker than the ribs 142, and therefore are less flexible than the ribs 142. As such, a potential for trapping external material in the indentations 144 is reduced.

Figure 8:
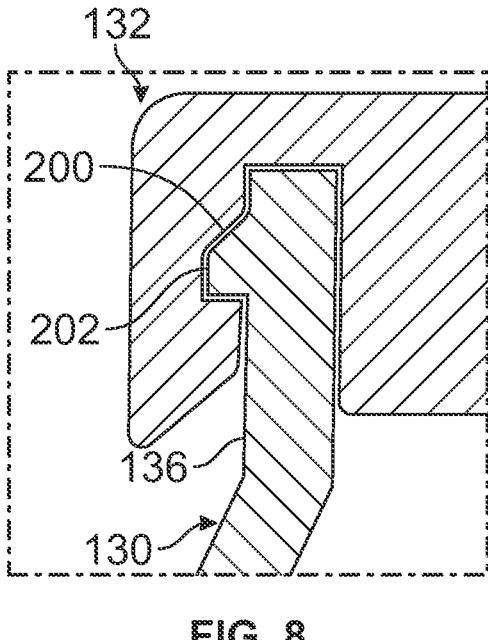
FIG. 8 illustrates a cross-sectional view of a securing interface between the boot and the cap, according to an example of the present disclosure.

FIG. 8 illustrates a cross-sectional view of a securing interface between the boot 130 and the cap 132, according to an example of the present disclosure. Instead of (or, optionally, in addition to) the securing pins 162 (shown in FIG. 3, for example), the cap 132 can include a circumferential channel 200 that is configured to receive and retain a circumferential ledge 202 of the upper neck 136 of the boot 130.

Figure 9:
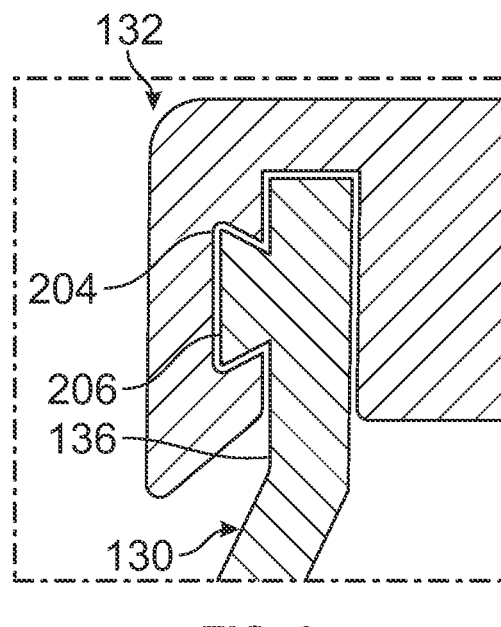
FIG. 9 illustrates a cross-sectional view of a securing interface between the boot and the cap, according to an example of the present disclosure.

FIG. 9 illustrates a cross-sectional view of a securing interface between the boot and the cap, according to an example of the present disclosure. Instead of (or, optionally, in addition to) the securing pins 162 (shown in FIG. 3, for example), the cap 132 can include a circumferential notch 204 that is configured to receive and retain a circumferential wedge 206 of the upper neck 136 of the boot 130.

Figure 10:
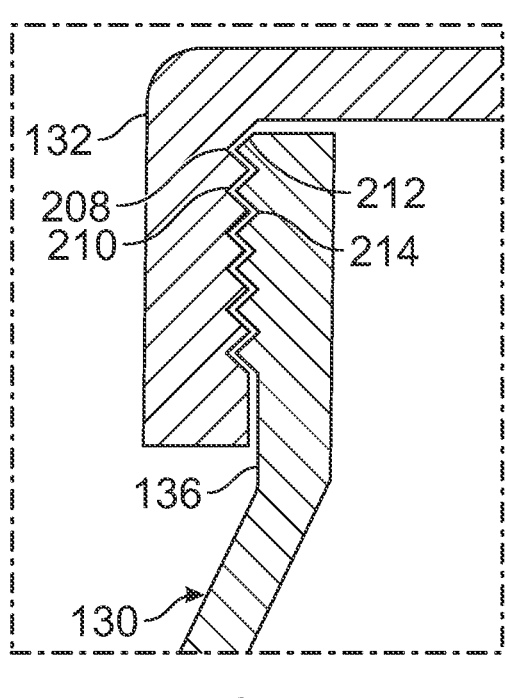
FIG. 10 illustrates a cross-sectional view of a securing interface between the boot and the cap, according to an example of the present disclosure.

FIG. 10 illustrates a cross-sectional view of a securing interface between the boot and the cap, according to an example of the present disclosure. Instead of (or, optionally, in addition to) the securing pins 162 (shown in FIG. 3, for example), the cap 132 can include a series of valleys 208 and peaks 210 that are configured to cooperate with teeth 212 and depressions 214 of the upper neck 136 of the boot 130.

Figure 11:
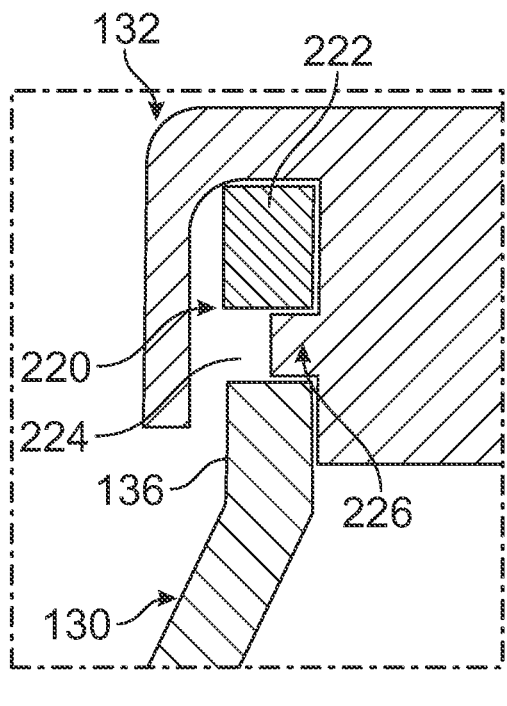
FIG. 11 illustrates a cross-sectional view of a securing interface between the boot and the cap, according to an example of the present disclosure.

FIG. 11 illustrates a cross-sectional view of a securing interface between the boot and the cap, according to an example of the present disclosure. Instead of (or, optionally, in addition to) the securing pins 162 (shown in FIG. 3, for example), the cap 132 can include a circumferential channel 220 into which an upper rim 222 of the upper neck 136 is configured to be retained. The upper rim 222 can include one or more slots 224 that receive one or more tabs 226 of the cap 132.

Figure 12:
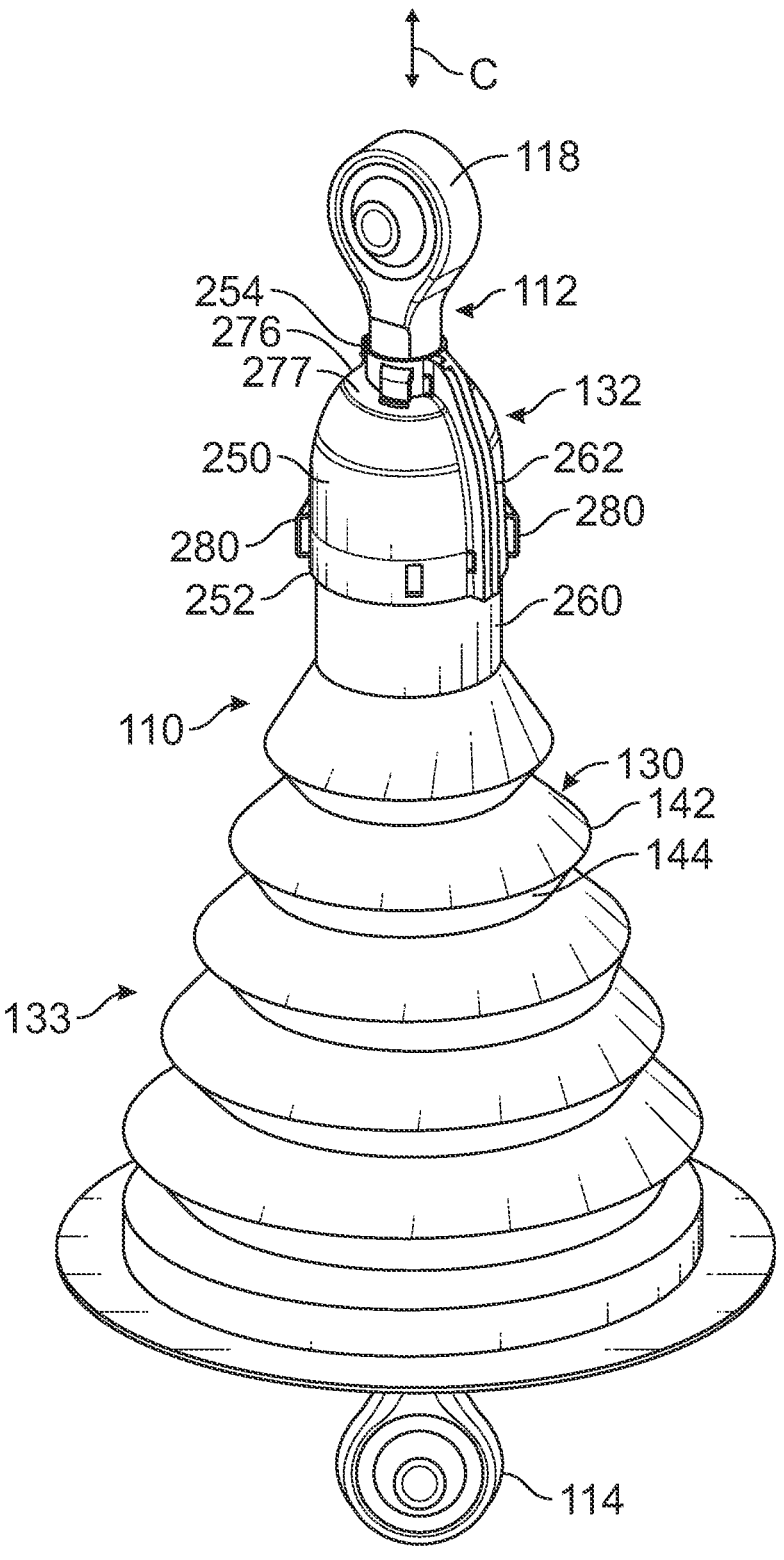
FIG. 12 illustrates an isometric lateral view of a covering system secured to a pitch link, according to an example of the present disclosure.

FIG. 12 illustrates an isometric lateral view of a covering system 110 secured to a pitch link, according to an example of the present disclosure. In this example, the upper end 118 of the pitch link 112 extends upwardly out of the cap 132.

Figure 13:
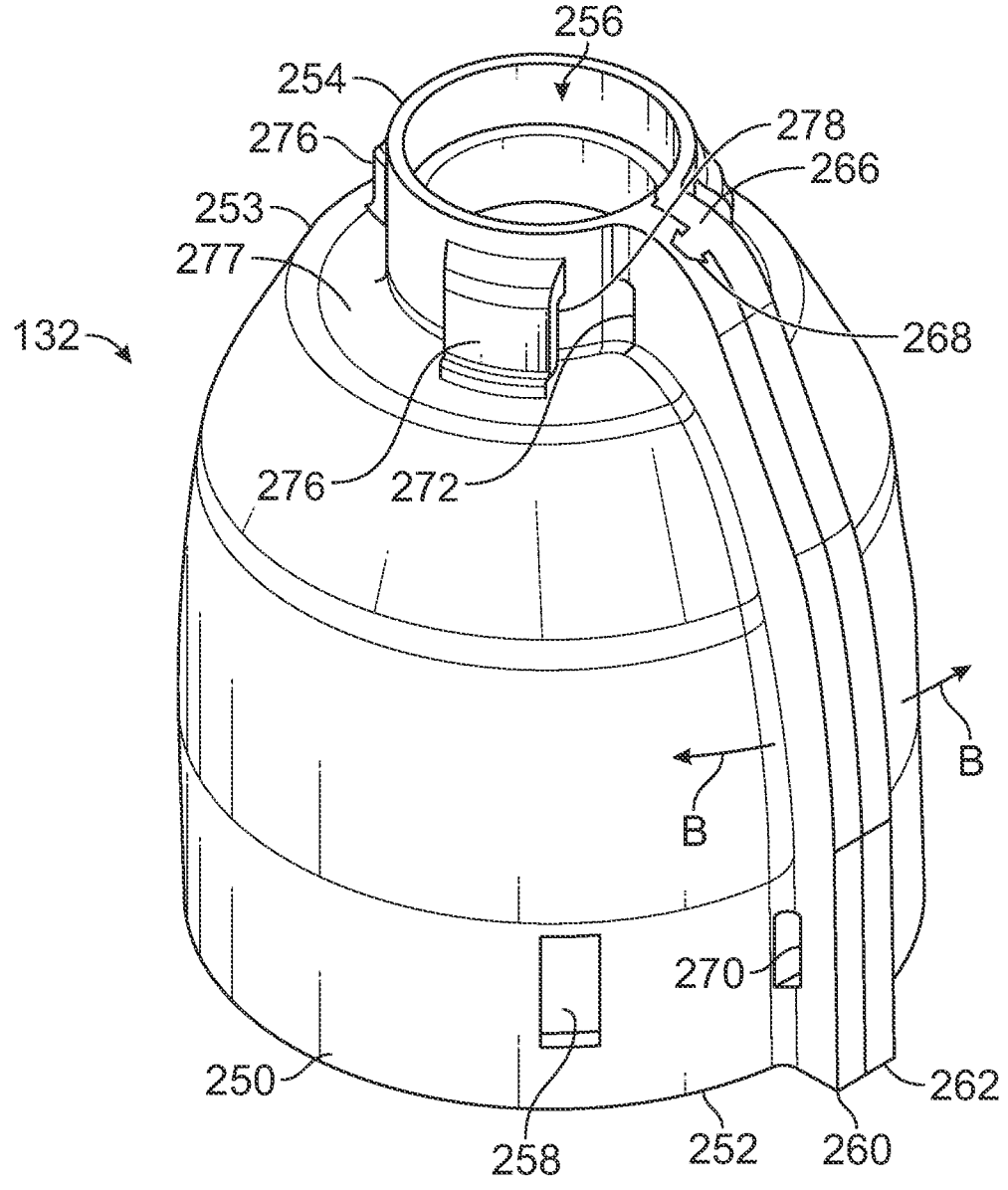
FIG. 13 illustrates an isometric top view of a cap, according to an example of the present disclosure.
Figures 14, 15:
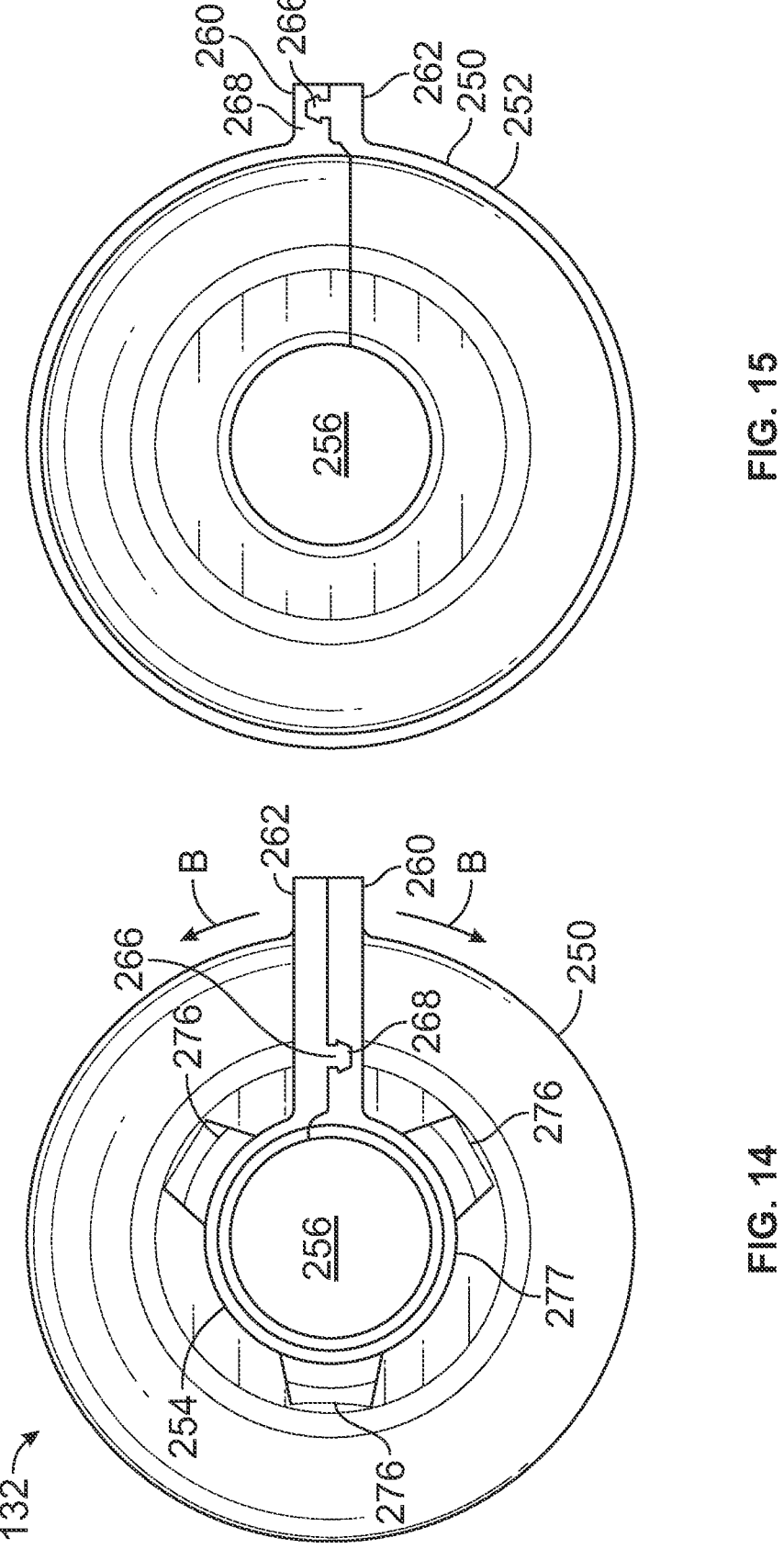
FIG. 14 illustrates a top view of the cap of FIG. 13.
FIG. 15 illustrates a bottom view of the cap of FIG. 13.

FIG. 13 illustrates an isometric top view of a cap 132, according to an example of the present disclosure. FIG. 14 illustrates a top view of the cap 132 of FIG. 13. FIG. 15 illustrates a bottom view of the cap 132 of FIG. 13. Referring to FIGS. 12-15, the cap 132 includes a perimeter wall 250 having a lower end 252 and an upper end 253. A collar 254 upwardly extends from the upper end 253. The collar 254 defines a passage 256 through which the upper end 118 of the pitch link 112 extends. A plurality of spaced-apart slots 258 are formed through the perimeter wall 250 proximate to the lower end 252. A first lip 260 upwardly extends over a height of the cap 132 from the lower end 252 to the collar 254. Similarly, a second lip 262 extends over a height of the cap 132 from the lower end 252 to the collar 254. The first lip 260 and the second lip 262 mirror one another, and abut against one another. The first lip 260 and the second lip 262 are removably secured to one another through one or more protuberances 266 that securely fit into reciprocal channels 268. The first lip 260 and the second lip 262 are configured to be separated to open the cap 132. For example, the first lip 260 and the second lip 262 can be peeled apart from one another in the directions of arrows B, to open the cap 132. In at least one other example, the cap 132 can include additional lips to facilitate removal of the cap 132, and can include multiple pieces, instead of a single unitary piece. For example, the cap 132 can include two portions (for example, halves) that are configured to removably secure to one another. In at least one example, the cap 132 can be manufactured through an additive manufacturing process such as vat photopolymerization. In such an example, the first lip 260 and the second lip 262 can be formed from the same polymer, but cured with different amounts of light, so that one lip can be harder than the other. In at least one example, the protuberances 266 can be additively manufactured and softer than channels 268 so that the protuberances can be deflected and readily squeezed within the channels 268.

As shown, tie passages 270 are formed in the first lip 260 and the second lip 262, proximate to the lower end 252. The tie passages 270 of the first lip 260 and the second lip 262 are aligned with one another to form a contiguous open passage. Similarly, tie passages 272 are formed in the first lip 260 and the second lip 262 at or otherwise proximate to the collar 254. The tie passages 272 of the first lip 260 and the second lip 262 are aligned with one another to form a contiguous open passage.

Additionally, cuffs 276 may outwardly extend from the collar 254 and connect to an upper ledge 277 of the perimeter wall 250. The cuffs 276 define tie passages 278 that are circumferentially aligned with the tie passages 272.

Figure 16:
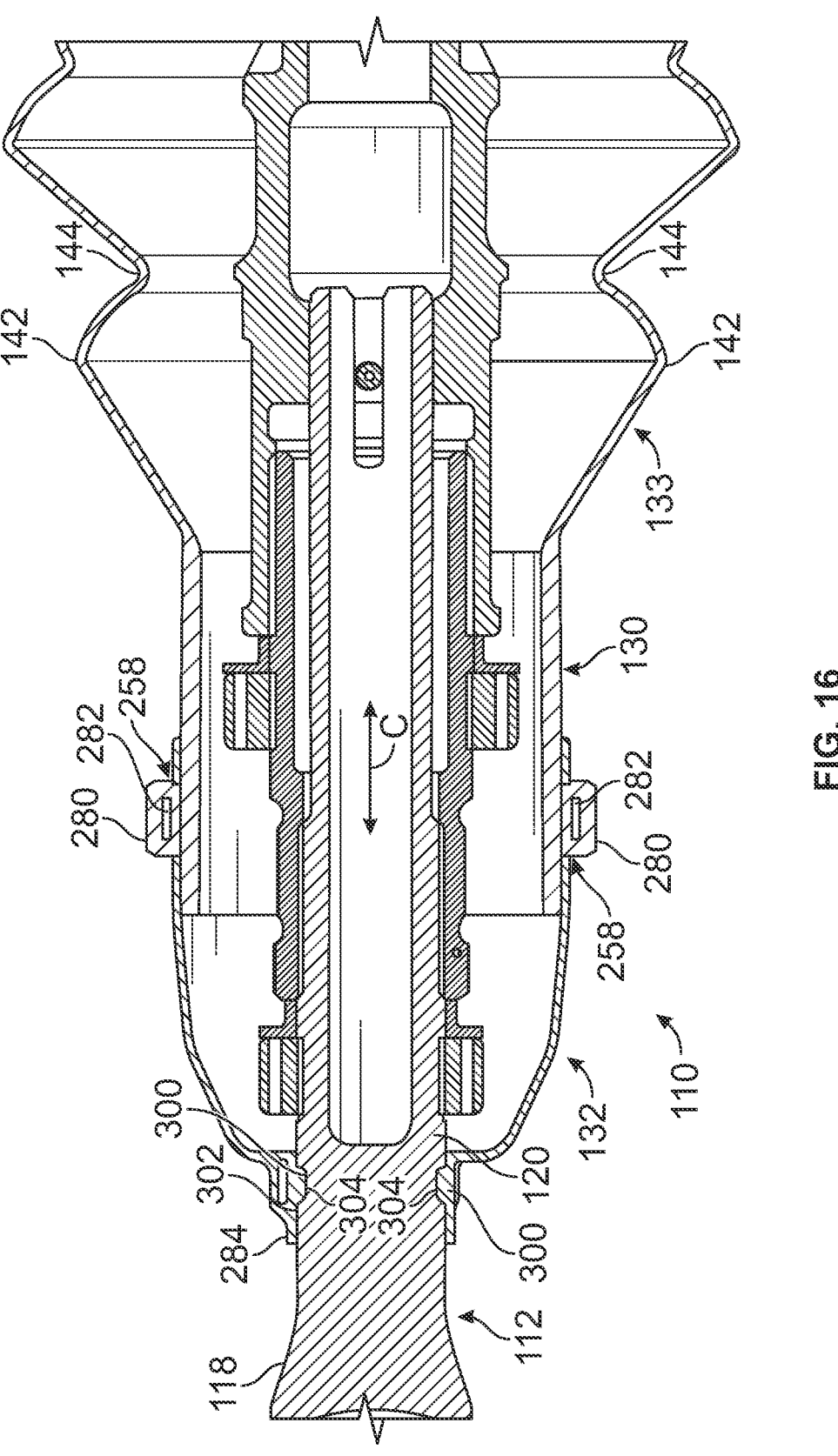
FIG. 16 illustrates an axial cross-sectional view of the covering system of FIG. 12 secured to the pitch link.

FIG. 16 illustrates an axial cross-sectional view of the covering system 110 of FIG. 12 secured to the pitch link. The wall of the system 110 can be configured as shown in FIGS. 6 and 7, for example. Referring to FIGS. 12-16, the boot 130 includes a plurality of tabs 280 that extend through the slots 258 of the cap 132, thereby removably securing the cap 132 to the boot 130. Each tab 280 can include a tie passage 282 that aligns with the tie passages 270 (shown in FIG. 13, for example). A flexible tie, such as a zip tie, can pass through the circumferentially aligned tie passages 270 and 282 to provide additional securing force to secure the cap 132 to the boot 130. Additionally, a flexible tie, such as a zip tie, can pass through the circumferentially aligned tie passages 272 and 278. Optionally, additional ties may not be used.

The collar 254 can also include an inwardly-directed seal 300 inwardly extending from an internal surface 302. The seal 300 can be an inwardly-directed circumferential rim. The seal 300 is sealingly retained within a circumferential channel 304 of the shaft 120 of the pitch link 112 proximate to the upper end 118. Because the cap 132 is formed of an elastomeric material, such as rubber, the nesting of the seal 300 within channel 304 prevents liquid from passing into the covering system 110.

As the pitch link 112 extends and retracts in the directions of arrows C, the axial motion is translated into the cap 132. Because the cap 132 is formed of a flexible material, such as rubber or thermoplastic elastomer, the cap 132 extends and compresses in response. Further, because the cap 132 is secured to the boot 130 by way of the tabs 280 extending through the slots 258, the motion of the cap 132 is translated into the boot 130, which also moves accordingly, as the boot 130 is also formed of the flexible material. In this manner, axial forces, and motion of the pitch link 112 is translated into the covering system 110, including the boot 130 and the cap 132, which move in response to the motion of the pitch link 112.

The cap 132 can be removed from the pitch link 112, such as by the first lip 260 and the second lip 262 being separated from one another, and peeled apart, thereby disengaging the seal 300 from the channel 304 and exposing the shaft 120 of the pitch link 112. Further, the cap 132 can be removed from the boot 130 during such motion as the tabs 280 disengage from the slots 258. After the cap 132 is removed, the boot 130 having the bellows 133 formed by the ribs 142 and indentations 144 (as described herein) can be compressed downwardly to expose further portions of the pitch link 112 so that the pitch link 112 can be inspected, such as for maintenance or replacement. Optionally, after the cap 132 is removed, the boot 130 can be lifted upwardly and completely removed from the pitch link 112.

Referring to FIGS. 1-16, examples of the present disclosure provide a covering system 110 for a pitch link 112 of a helicopter 102. The covering system 110 includes a boot 130 having a bellows 133, and a cap 132 removably secured to the boot 130. The boot 130 and the cap 132 are configured to cover at least a portion of the pitch link 112. The cap 132 is removable from the boot 130 to provide access to the pitch link 112.

The cap 132 removably secures to the boot 130 to provide a liquid tight protective cover for the pitch link 112. The cap 132 is configured to be quickly removed from the boot 130 in order to provide effective and efficient access to the pitch link 112. The boot 130 and the cap 132 can be formed through three-dimensional printing, for example, using materials including (but not limited to) rubber, filled rubber, rubber with engineered porosity, polymers featuring graded properties, and the like. For example, a three-dimensional printer can be used to print a part having in the same volume flexible and soft portions along with portions that are stiffer and harder. The bellows 133 includes the ribs 142 and indentations 144, which can provide variable stiffness and flexibility. As described, the ribs 132 provides outwardly-bowed, curved surfaces instead of sharp corners, thereby providing a more resilient structure having increased longevity, because it can be shown that, in general, a curved surface undergoes smaller deformation (measured in inch/inch) than a straight surface if both surfaces are subjected to the same deflection (measured in inches).

In at least one example, the boot 130 can include ribs 142 and indentations 144 having different thicknesses, or the same thickness. In at least one example, the boot 130 can be formed via three-dimensional printing (such as vat photo-polymerization) resulting in portions having different hardness and flexibility.

Further, the disclosure comprises examples according to the following clauses:

Clause 1. A covering system for a pitch link of a helicopter, the covering system comprising:
   a boot having a bellows; and
   a cap removably secured to the boot, wherein the boot and the cap are configured to cover at least a portion of the pitch link, and wherein the cap is removable from the boot to provide access to the pitch link.

Clause 2. The covering system of Clause 1, wherein the boot and the cap are formed of a flexible material.

Clause 3. The covering system of Clause 2, wherein the flexible material comprises a thermoplastic elastomer (or other flexible materials).

Clause 4. The covering system of any of Clauses 1-3, wherein the bellows comprises a plurality of outwardly-extending ribs and a plurality of inwardly-extending indentations.

Clause 5. The covering system of Clause 4, wherein the plurality of outwardly-extending ribs include curved surfaces.

Clause 6. The covering system of Clauses 4 or 5, wherein the plurality of outwardly-extending ribs have a first thickness, and the plurality of inwardly-extending indentations have a second thickness, and wherein the first thickness differs from the second thickness.

Clause 7. The covering system of any of Clauses 1-6, wherein an upper neck extends from a first end of the bellows, and a base is at a second end of the bellows, wherein the second end is opposite from the first end, and wherein the second end is wider than the first end.

Clause 8. The covering system of any of Clauses 1-7, wherein the boot comprises one or more securing pins that are configured to be removably retained within one or more slots of the cap.

Clause 9. The covering system of any of Clauses 1-8, wherein the cap is configured to cover an upper end of the pitch link.

Clause 10. The covering system of any of Clauses 1-9, wherein the cap includes a passage that allows an upper end of the pitch link to extend upwardly out of the cap.

Clause 11. The covering system of any of Clauses 1-10, wherein the cap comprises one or more slots that receive and retain one or more tabs of the boot to secure the cap to the boot.

Clause 12. The covering system of any of Clauses 1-11, wherein the cap comprises a first lip and a second lip removably secured together, and wherein the first lip and the second lip are configured to be separated to open the cap.

Clause 13. The covering system of any of Clauses 1-12, wherein one or both of the boot or the cap comprises a plurality of tie passages that are configured to receive one or more flexible ties.

Clause 14. The covering system of any of Clauses 1-13, wherein the cap comprises a seal configured to be sealingly retained within a channel of a shaft of the pitch link.

Clause 15. A covering method for a pitch link of a helicopter, the covering method comprising:
   removably securing a cap to a boot having a bellows, wherein the boot and the cap are configured to cover at least a portion of the pitch link, and wherein the cap is removable from the boot to provide access to the pitch link.

Clause 16. A helicopter comprising:
   a rotor assembly including a pitch link; and
   a covering system for the pitch link, wherein the covering system comprises:
      a boot having a bellows; and
      a cap removably secured to the boot, wherein the boot and the cap cover at least a portion of the pitch link, and wherein the cap is removable from the boot to provide access to the pitch link.

Clause 17. The helicopter of Clause 16, wherein the bellows comprises a plurality of outwardly-extending ribs and a plurality of inwardly-extending indentations, wherein the plurality of outwardly-extending ribs include curved surfaces, wherein the plurality of outwardly-extending ribs have a first thickness, and the plurality of inwardly-extending indentations have a second thickness, and wherein the first thickness differs from the second thickness.

Clause 18. The helicopter of Clauses 16 or 17, wherein the cap covers an upper end of the pitch link.

Clause 19. The helicopter of any of Clauses 16-18, wherein the cap includes a passage, and wherein an upper end of the pitch link extends upwardly out of the cap.

Clause 20. The helicopter of any of Clauses 16-19, wherein the cap comprises:
   one or more slots that receive and retain one or more tabs of the boot to secure the cap to the boot;
   a first lip and a second lip removably secured together, and wherein the first lip and the second lip are configured to be separated to open the cap; and
   a seal sealingly retained within a channel of a shaft of the pitch link.

As described herein, examples of the present disclosure provide an improved system and method for covering a pitch link of a helicopter. Further, examples of the present disclosure provide durable covers for pitch links. Additionally, examples of the present disclosure provide efficient and cost-effective covers for pitch links.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A covering system for a pitch link of a helicopter, the covering system comprising:
   a boot having a bellows; and
   a cap removably secured to the boot, wherein the boot and the cap are formed of a flexible material, wherein the boot and the cap are configured to cover at least a portion of the pitch link, and wherein the cap is removable from the boot to provide access to the pitch link.

2. The covering system of claim 1, wherein the flexible material comprises a thermoplastic elastomer.

3. The covering system of claim 1, wherein the bellows comprises a plurality of outwardly-extending ribs and a plurality of inwardly-extending indentations.

4. The covering system of claim 3, wherein the plurality of outwardly-extending ribs include curved surfaces.

5. The covering system of claim 3, wherein the plurality of outwardly-extending ribs have a first thickness, and the plurality of inwardly-extending indentations have a second thickness, and wherein the first thickness differs from the second thickness.

6. The covering system of claim 1, wherein an upper neck extends from a first end of the bellows, and a base is at a second end of the bellows, wherein the second end is opposite from the first end, and wherein the second end is wider than the first end.

7. The covering system of claim 1, wherein the boot comprises one or more securing pins that are configured to be removably retained within one or more slots of the cap.

8. The covering system of claim 1, wherein the cap is configured to cover an upper end of the pitch link.

9. The covering system of claim 1, wherein the cap includes a passage that allows an upper end of the pitch link to extend upwardly out of the cap.

10. The covering system of claim 1, wherein the cap comprises one or more slots that receive and retain one or more tabs of the boot to secure the cap to the boot.

11. The covering system of claim 1, wherein the cap comprises a first lip and a second lip removably secured together, and wherein the first lip and the second lip are configured to be separated to open the cap.

12. The covering system of claim 1, wherein one or both of the boot or the cap comprises a plurality of tie passages that are configured to receive one or more flexible ties.

13. The covering system of claim 1, wherein the cap comprises a seal configured to be sealingly retained within a channel of a shaft of the pitch link.

14. A covering method for a pitch link of a helicopter, the covering method comprising:
   removably securing a cap to a boot having a bellows, wherein the boot and the cap are formed of a flexible material, wherein the boot and the cap are configured to cover at least a portion of the pitch link, and wherein the cap is removable from the boot to provide access to the pitch link.

15. A helicopter comprising:
   a rotor assembly including a pitch link; and
   a covering system for the pitch link, wherein the covering system comprises:
      a boot having a bellows; and
      a cap removably secured to the boot, wherein the boot and the cap are formed of a flexible material, wherein the boot and the cap cover at least a portion of the pitch link, and wherein the cap is removable from the boot to provide access to the pitch link.

16. The helicopter of claim 15, wherein the bellows comprises a plurality of outwardly-extending ribs and a plurality of inwardly-extending indentations, wherein the plurality of outwardly-extending ribs include curved surfaces, wherein the plurality of outwardly-extending ribs have a first thickness, and the plurality of inwardly-extending indentations have a second thickness, and wherein the first thickness differs from the second thickness.

17. The helicopter of claim 15, wherein the cap covers an upper end of the pitch link.

18. The helicopter of claim 15, wherein the cap includes a passage, and wherein an upper end of the pitch link extends upwardly out of the cap.

19. The helicopter of claim 15, wherein the cap comprises:
   one or more slots that receive and retain one or more tabs of the boot to secure the cap to the boot;
   a first lip and a second lip removably secured together, and wherein the first lip and the second lip are configured to be separated to open the cap; and
   a seal sealingly retained within a channel of a shaft of the pitch link.

20. The helicopter of claim 15, wherein the flexible material comprises a thermoplastic elastomer.

* * * * *